(12) United States Patent
Chang et al.

(10) Patent No.: US 11,506,892 B1
(45) Date of Patent: Nov. 22, 2022

(54) HOLOGRAPHIC DISPLAY SYSTEM FOR A MOTOR VEHICLE

(71) Applicant: GM Global Technology Operations LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/306,081

(22) Filed: May 3, 2021

(51) Int. Cl.
    *G02B 27/01* (2006.01)
    *H04N 9/31* (2006.01)
    *B60K 35/00* (2006.01)

(52) U.S. Cl.
    CPC .......... *G02B 27/0103* (2013.01); *B60K 35/00* (2013.01); *H04N 9/312* (2013.01); *B60K 2370/1529* (2019.05); *B60K 2370/29* (2019.05); *B60K 2370/333* (2019.05); *B60K 2370/334* (2019.05); *G02B 27/0172* (2013.01)

(58) Field of Classification Search
    CPC ........ G02B 27/0103; G02B 2027/0172; G02B 2027/0174; G02B 2027/0123; G02B 27/0172; G03H 1/2294; H04N 9/312; B60K 35/00; B60K 2370/1529; B60K 2370/029
    See application file for complete search history.

(56) References Cited

U.S. PATENT DOCUMENTS

| | | |
|---|---|---|
| 8,072,686 B2 | 12/2011 | Cui et al. |
| 8,098,171 B1 | 1/2012 | Szczerba et al. |
| 8,164,543 B2 | 4/2012 | Seder et al. |
| 8,269,652 B2 | 9/2012 | Seder et al. |
| 8,317,329 B2 | 11/2012 | Seder et al. |
| 8,330,673 B2 | 12/2012 | Cui et al. |
| 8,344,894 B2 | 1/2013 | Szczerba |
| 8,350,724 B2 | 1/2013 | Szczerba et al. |
| 8,358,224 B2 | 1/2013 | Seder et al. |
| 8,384,531 B2 | 2/2013 | Szczerba et al. |
| 8,384,532 B2 | 2/2013 | Szczerba et al. |
| 8,395,529 B2 | 3/2013 | Seder et al. |
| 8,427,395 B2 | 4/2013 | Seder et al. |

(Continued)

FOREIGN PATENT DOCUMENTS

WO   WO-2018211074 A1 * 11/2018 ......... G02B 27/0081

*Primary Examiner* — Xuemei Zheng
(74) *Attorney, Agent, or Firm* — Vivacqua Crane, PLLC

(57) ABSTRACT

A holographic display system for a motor vehicle includes a light source for generating a beam of coherent light and a spatial light modulator (SLM) having a two-dimensional pixel array. The two-dimensional pixel array modulates the beam of coherent light for generating a plurality of subframes, with each subframe being associated with one of a plurality of partial fields of view. The system further includes a scanner for directing the subframes onto associated sections of a display surface. The system further includes a computer having a memory including instructions, such that a processor is programmed to control the two-dimensional pixel array of the SLM for generating the subframes. The processor is further programmed to control the scanner for directing the subframes onto associated sections of the display surface and displaying a reconstructed image within a full field of view, which includes each of the partial fields of view.

17 Claims, 5 Drawing Sheets

(56) References Cited

U.S. PATENT DOCUMENTS

| | | | |
|---|---|---|---|
| 8,482,486 B2 | 7/2013 | Seder et al. | |
| 8,564,502 B2 | 10/2013 | Cui et al. | |
| 8,629,784 B2 | 1/2014 | Szczerba et al. | |
| 8,692,739 B2 | 4/2014 | Mathieu et al. | |
| 8,704,653 B2 | 4/2014 | Seder et al. | |
| 8,817,090 B2 | 8/2014 | Szczerba et al. | |
| 8,830,141 B2 | 9/2014 | Seder et al. | |
| 8,912,978 B2 | 12/2014 | Szczerba et al. | |
| 9,030,515 B2 | 5/2015 | Stowe et al. | |
| 9,162,622 B2 | 10/2015 | Szczerba et al. | |
| 9,688,287 B2 | 6/2017 | Seder et al. | |
| 9,905,170 B2 | 2/2018 | Carpenter et al. | |
| 10,302,937 B2 | 5/2019 | Ferris et al. | |
| 10,423,038 B2 | 9/2019 | Seder et al. | |
| 10,629,852 B2 | 4/2020 | Chang et al. | |
| 10,747,314 B1 | 8/2020 | Chang et al. | |
| 10,860,093 B1 | 12/2020 | Chang et al. | |
| 10,880,529 B2 | 12/2020 | Chang et al. | |
| 2016/0011565 A1* | 1/2016 | Sung | G03H 1/0808 359/9 |
| 2017/0161949 A1 | 6/2017 | Seder et al. | |
| 2017/0255012 A1* | 9/2017 | Tam | G02B 27/017 |
| 2020/0326655 A1* | 10/2020 | Chang | H04N 9/3161 |
| 2021/0005549 A1 | 1/2021 | Zhu | |

\* cited by examiner

HOLOGRAPHIC DISPLAY SYSTEM FOR A MOTOR VEHICLE

INTRODUCTION

The present disclosure relates to holographic display systems for motor vehicles, and more particularly to a holographic display system controlling a spatial light modulator for enhancing the resolution of reconstructed images and enlarging an associated eyebox size.

Car manufacturers are continuously investigating improvements to the resolution and eyebox size of Augmented Reality (AR) Head-Up-Displays (HUD). The eyebox of the AR HUDs is the area in which the driver is able to view the entire display. Modern luxury or premium vehicles can include AR HUDs with spatial light modulators (SLMs) that modulate light according to a fixed resolution or spatial (pixel) pattern. SLMs are typically used to control incident light in amplitude-only, phase-only or a combination thereof. SLMs generate images by diffraction or redistribution of light, instead of blocking light via conventional projection systems. SLMs operate in both reflection modes, e.g., liquid crystal on silicon (LCoS), and transmissive modes, e.g., glass-on-glass. Still in other examples, the SLMs can be a MEMS mirror SLM or other suitable SLMs. SLMs can provide a high-speed phase or amplitude modulation, a high-efficiency operation, and a user-friendly graphical software interface.

The traditional solution for increasing the resolution of AR HUDs and increasing the associated eyebox size is to increase the resolution of the SLM. Based on performance requirements for the field of view and the eyebox, it can be desirable to have an SLM with more than 4 k resolution to provide commensurate resolution for the AR HUD. The use of multiple SLMs has also been proposed to increase the viewing zone angle and screen size of holographic display systems. However, increasing the resolution of the SLM and using multiple SLMs can increase the cost, weight, and complexity of the AR HUDs.

Thus, while existing holographic display systems achieve their intended purpose, there is a need for a new and improved holographic display system that addresses these issues.

SUMMARY

According to several aspects of the present disclosure, a holographic display system is provided for a motor vehicle. The system includes a light source for generating a beam of coherent light and a spatial light modulator (SLM) including a two-dimensional pixel array with an SLM resolution, which encoded with holograms diffracts the coherent light. The two-dimensional pixel array modulates the beam of coherent light for generating a plurality of subframes, with each of the subframes being associated with one of a plurality of partial fields of view. The system further includes a display surface having a plurality of sections. The system further includes a computer having a processor coupled to the light source and the SLM. The computer further includes a memory having instructions, such that the processor is programmed to control at least the two-dimensional pixel array of the SLM for generating the subframes for displaying a reconstructed image within a full field of view, where the full field of view includes each of the partial fields of views.

In one aspect, the reconstructed image on the display surface has a total image resolution, and the total image resolution is higher than the SLM resolution.

In another aspect, the processor is further programmed to control at least the SLM to direct the subframes onto the sections, such that the subframes are tiled adjacent to one another without overlapping one another.

In another aspect, the total image resolution is equal to the SLM resolution multiplied by a number of the sections displaying the subframes.

In another aspect, the two-dimensional pixel array of the SLM has an SLM eyebox size, and the display surface has a display surface eyebox size, which is equal to the SLM eyebox size multiplied an inverse of the ratio between the partial field of view of one of the sections and the full field of view.

In another aspect, the system further includes a scanner for directing the subframes onto an associated one of the sections of the display surface. The processor is coupled to the SLM and programmed to control the scanner to direct the subframes onto an associated one of the sections of the display surface for displaying the reconstructed image within the full field of view, where the full field of view includes each of the partial fields of view. The processor is further programmed to control at least one of the scanner and the SLM for directing the subframes onto the sections, with the sections being arranged in a plurality of rows and a plurality of columns on the display surface.

In another aspect, the processor is further programmed to control the SLM to angularly dither the subframes onto the sections, such that each of the subframes has an enhanced portion, and the enhanced portions of the subframes overlap one another on the display surface. The enhanced portions of the associated subframes have a perceived resolution, which is higher than the SLM resolution.

According to several aspects of the present disclosure, a motor vehicle includes a body that defines a passenger cabin and a plurality of glass panels that surrounds the passenger cabin. The glass panels include at least one of a front windshield, a rear windshield, a sunroof, and a plurality of windows surrounding the passenger cabin. The motor vehicle further includes a holographic display system coupled to the body. The system includes a light source for generating a beam of coherent light and a spatial light modulator (SLM) having a two-dimensional pixel array with an SLM resolution, which encoded with holograms diffracts the coherent light. The two-dimensional pixel array modulates the beam of coherent light for generating a plurality of subframes, with each of the subframes being associated with one of a plurality of partial fields of view. The system further includes a display surface having a plurality of sections. The system further includes a computer having a processor coupled to the light source, the SLM, and the scanner. The computer further includes a memory having instructions such that the processor is programmed to control the two-dimensional pixel array of the SLM for generating the subframes. The processor is further programmed to control the scanner to direct the subframes onto associated sections of the display surface for displaying a reconstructed image within a full field of view, which includes each of the partial fields of view.

In one aspect, the display surface is a portion of at least one of the front windshield, the rear windshield, the sunroof, and the windows.

In another aspect, the system further includes a combiner glass disposed within the passenger cabin, and the display surface is a portion of the combiner glass.

In another aspect, the light source is a LASER, and the SLM is one of a liquid crystal on silicon (LCOS) SLM and a MEMS mirror SLM.

In another aspect, the reconstructed image on the display surface has a total image resolution, and the total image resolution is higher than the SLM resolution.

In another aspect, the processor is further programmed to control at least the SLM to direct the subframes onto the sections, such that the subframes are tiled adjacent to one another without overlapping one another.

In another aspect, the total image resolution is equal to the SLM resolution multiplied by a number of the sections displaying the subframes.

In another aspect, the two-dimensional pixel array of the SLM has an SLM eyebox size. The display surface has a display surface eyebox size, which is equal to the SLM eyebox size multiplied an inverse of the ratio between the partial field of view of one of the sections and the full field of view generated by the SLM.

In another aspect, the system further includes a scanner for directing the subframes onto an associated one of the sections of the display surface. The processor is coupled to the scanner and programmed to control the scanner to direct the subframes onto an associated one of the sections of the display surface for displaying the reconstructed image within the full field of view, where the full field of view includes each of the partial fields of view. The processor is further programmed to control the scanner to direct the subframes onto the sections, with the sections being arranged in a plurality of rows and a plurality of columns on the display surface.

In another aspect, the processor is further programmed to control the SLM to angularly dither the subframes onto the sections, such that each of the subframes has an enhanced portion. The enhanced portions of the subframes overlap one another on the display surface, where the enhanced portions of the associated subframes have a perceived resolution that is higher than the SLM resolution.

According to several aspects of the present disclosure, a method is provided for operating a holographic display system for a motor vehicle. The system includes a light source and a spatial light modulator (SLM) having a two-dimensional pixel array with an SLM resolution, which encoded with holograms diffracts the coherent light. The system further includes a display surface having a plurality of sections, a scanner, and a computer having a processor and a memory. The method includes the light source generating a beam of coherent light. The method further includes the SLM modulating the beam of coherent light to generate a plurality of subframes, such that each of the subframes is associated with one of a plurality of partial fields of view. The method further includes at least the SLM directing the subframes onto an associated one of the sections of the display surface. The method further includes the processor controlling the two-dimensional pixel array of the SLM to generate the subframes. The method further includes the processor controlling the scanner to direct the subframes onto an associated one of the sections of the display surface for displaying a reconstructed image within a full field of view, such that the full field of view includes each of the partial fields of view.

In one aspect, the method further includes displaying the reconstructed image on the display surface, such that the reconstructed image has a total image resolution that is higher than the SLM resolution.

In another aspect, the method further includes the processor controlling at least one of the SLM and the scanner to direct the subframes onto the sections, such that the subframes are overlapping one another or are tiled adjacent to one another without overlapping one another.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes one example of a motor vehicle having a holographic display system (system) 100. One non-limiting example of the system includes an Augmented Reality (AR) Head-Up Display (HUD) that can blend holographic display elements with other display elements or environmental characteristics to make holographic images appear in relation to the physical world. As described in detail below, the system 100 includes a spatial light modulator (SLM) 102 with a two-dimensional pixel array 104. The two-dimensional pixel array 104 has an associated resolution, an eyebox, and a pitch, and the two-dimensional pixel array 104 uses an encoded hologram to generate subframes for associated partial fields of view. The system further includes a computer for controlling the SLM to display a reconstructed image, which is formed from each of the partial fields of view and has a maximum field of view based on the pitch of the SLM. The reconstructed image has a resolution that is higher than the resolution of the SLM and has an eyebox size that is larger than the eyebox size of the SLM. As described in in one non-limiting example below, the subframes can be stitched to one another where the subframes are displayed and/or positioned adjacent to one another on the display surface to form full frames with the full field of view. The total perceived image would be the result of stitching the subframes to increase total resolution. In another example, the subframes are angularly dithered such that portions of the subframes overlap one another on common sections of the display surface. The perceived resolution of the overlapping portions on the common section is higher than the resolution of the SLM. The system may be used as part of any land, sea, or air vehicle. In other non-limiting examples, the system may be used as part of a stationary or mobile power plant, a robot, or a platform. For illustrative consistency, an application of the system as an integral part of the motor vehicle will be described hereinafter without limiting the present disclosure to such an implementation.

Figure 1:
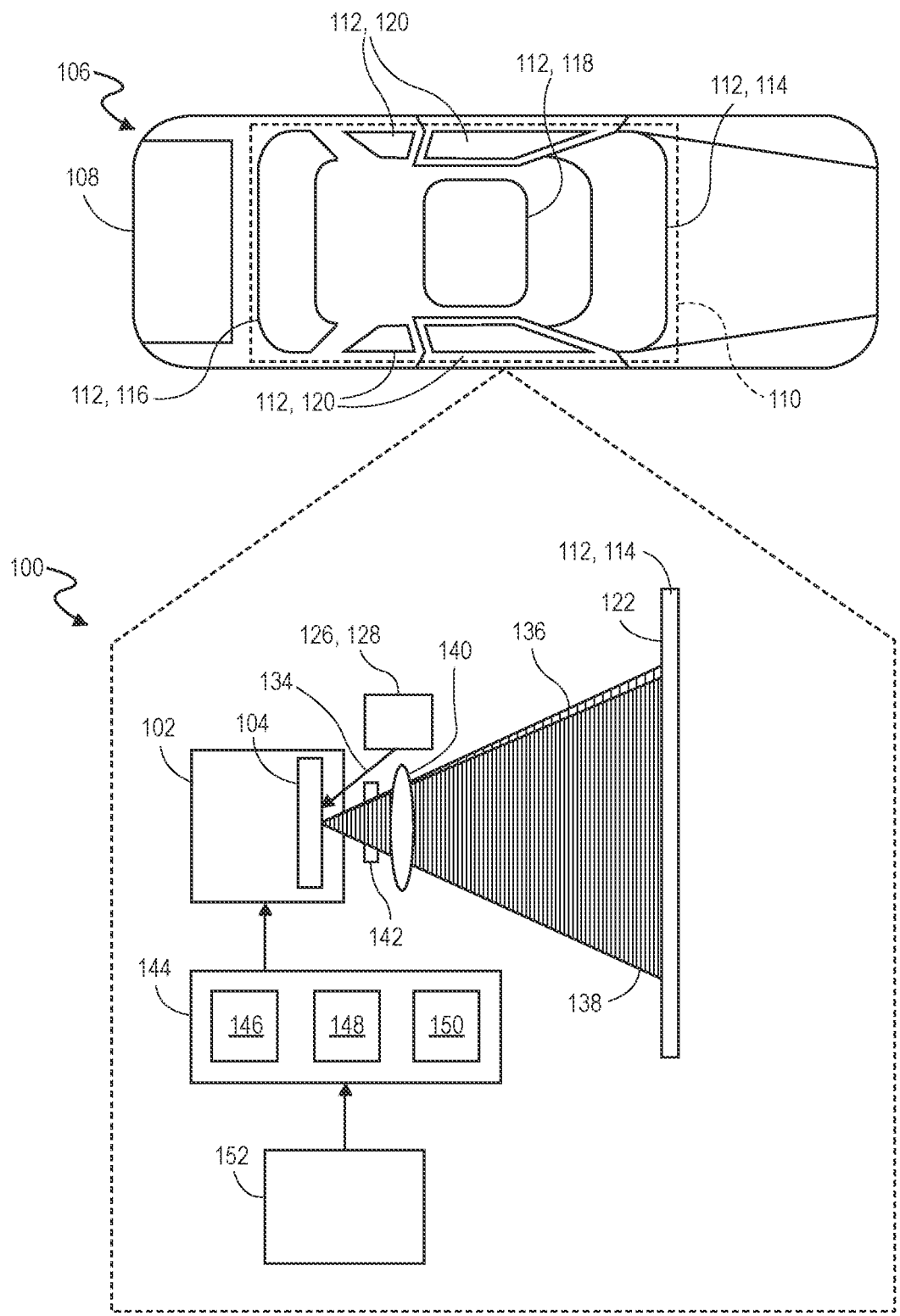
FIG. 1 is a schematic view of one example of a motor vehicle having a holographic display system.

Referring to FIG. 1, one example of a motor vehicle 106 includes a body 108 defining a passenger cabin 110 (FIG. 2) and a plurality of glass panels 112 surrounding the passenger cabin 110. The glass panels 112 can include at least one of a front windshield 114, a rear windshield 116, a sunroof 118, and a plurality of windows 120 surrounding the passenger cabin 110.

Figure 2:
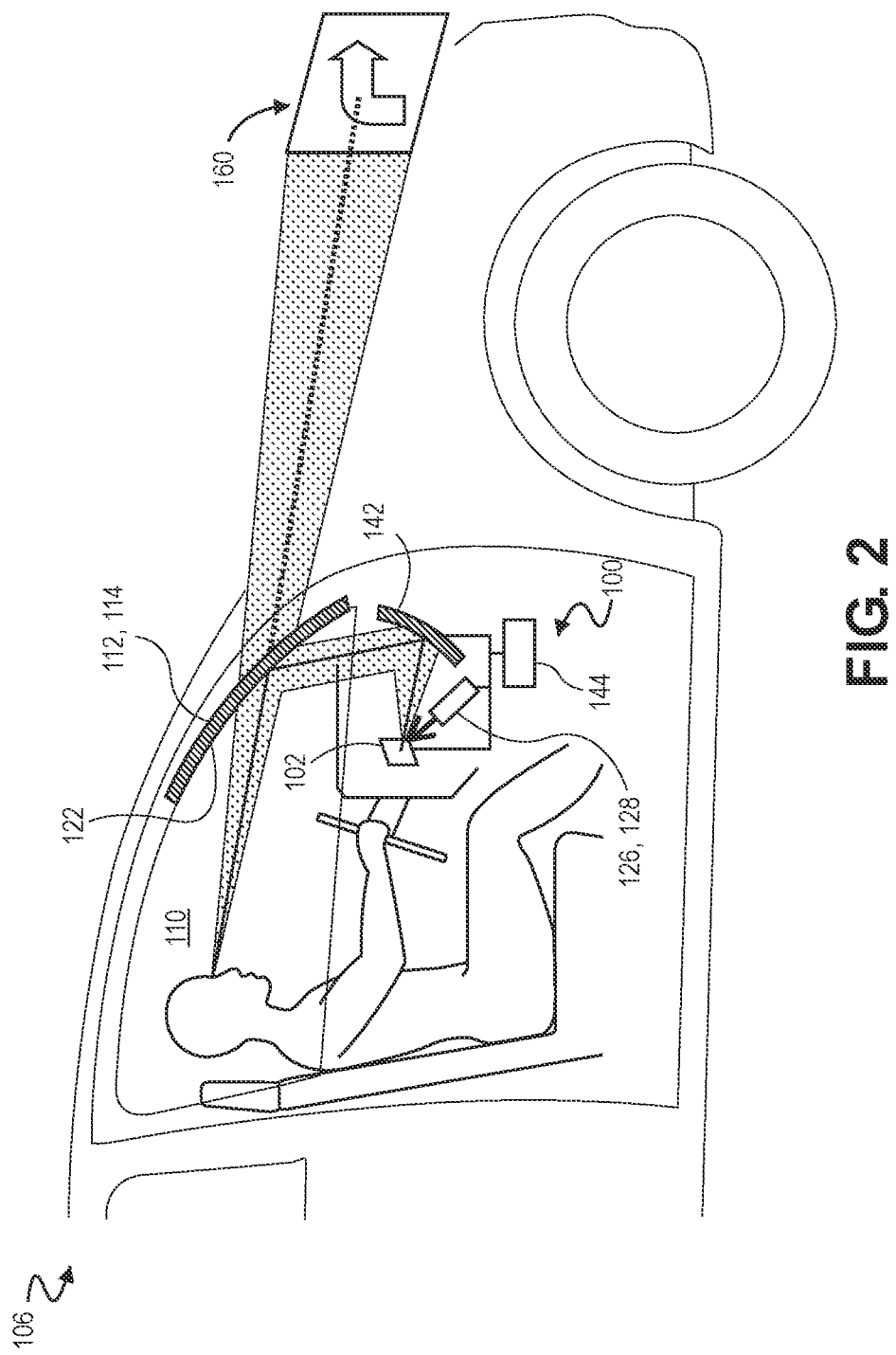
FIG. 2 is a schematic view of a passenger cabin of the motor vehicle of FIG. 1, illustrating one example of the system having a spatial light modulator (SLM) with a partial field of view, an SLM resolution, and an SLM eyebox.
Figure 3:
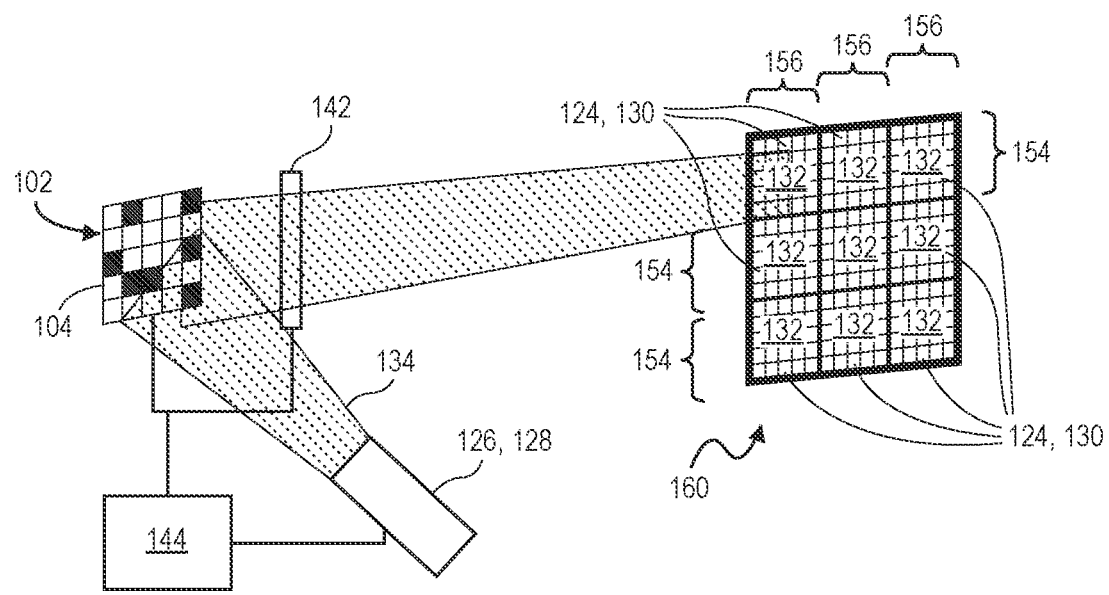
FIG. 3 is a schematic view of the system of FIG. 2, illustrating one of example of the system for stitching the subframes to one another to provide a frame with a full field of view, a resolution that is higher than the SLM resolution, and an eyebox size that is larger than the SLM eyebox size.

As best shown in FIGS. 2 and 3, the system 100 further includes a display surface 122 having a plurality of sections 124 (FIG. 3). One non-limiting example of the display surface can be an integral portion of the front windshield 114. In other non-limiting examples, the display surface can be a portion of the rear windshield 116 (FIG. 1), the sunroof 118, the windows 120, or other suitable portions of the vehicle 106.

Referring back to FIG. 1, the motor vehicle 106 further includes a holographic display system 100 (system) coupled to the body 108. The system 100 includes a light source 126 for generating a beam of coherent light or encoded hologram. One non-limiting example of the light source 126 can include a LASER 128. While a single LASER 128 is depicted in FIG. 1, it is contemplated that the system can include two or more LASERS, such as separate red, green, and blue LASERS.

The system 100 further includes the spatial light modulator (SLM) 102 having the two-dimensional pixel array 104 with an SLM resolution and an SLM eyebox. The two-dimensional pixel array 104 modulates the beam of coherent light for generating a plurality of subframes 130 (FIG. 3) or input frames, with each of the subframes 130 being associated with one of a plurality of partial fields of view 132. In the illustrated non-limiting example, the two-dimensional pixel array 104 can modulate the beam of light for generating a subframes 130 associated with nine partial fields of view that can be displayed to provide a full field of view. However, it is contemplated that the two-dimensional pixel array can modulate the beam for generating subframes associated with partial fields of view, such that each subframe forms a fraction of the full field of view. The SLM is a fast-switching high-pixel density spatial light modulator (SLM) with driving circuitry to provide a high-frame rate. The high frame rate can be a 60 Hz frame rate, such that the SLM displays a sequence of subframes in a time sequential manner at a rate that the human eye does not experience flicker while viewing the whole field of view. However, it is contemplated that the frame rate can be above or below 60 Hz. In one non-limiting example, the two-dimensional pixel array 104 is a liquid crystal on silicon (LCoS) two-dimensional pixel array 104 that provides diffractive phase elements to support holographic projection. In other examples, the spatial light modulators may be MEMS shutter displays or DLP DMD arrays. The spatial light modulators may be independently controlled to block, transmit, or reflect different rays on a high-resolution basis.

In the non-limiting example illustrated in FIG. 1, the LASER 128 can project a laser beam 134 incident to the two-dimensional pixel array 104 of the SLM 102 with corresponding diffracted images 136, 138 passing through a Fourier-transform lens 140 that performs beam forming to focus the resulting perceived image on the display surface 122. The diffracted images 136, 138 can result from the LASER beam projected onto the two-dimensional pixel array 104 and changes to images output on the two-dimensional pixel array 104 over a period of time. In other examples, the system may not include the Fourier-transform lens.

Referring to FIG. 3, the system 100 further includes a scanner 142 for directing the subframes 130 onto an associated one of the sections 124 of the display surface 122. Non-limiting examples of the scanner can include a screen scanning system, a viewing-zone scanning system, and a 360-degree scanning system. It is contemplated that other examples of the system having other suitable SLMs may not include the scanner with the direction of the beam being encoded into the holograms of subframes of an SLM.

Referring back to FIG. 1, the system 100 further includes a computer 144 having a processor 146 coupled to the light source 126, the SLM 102, and the scanner 142. The processor 146 can be used to compute image data in real-time to be output on the two-dimensional pixel array 104 of the SLM 102. The processor 146 can include processing circuitry that may include an application specific integrated circuit (ASIC), an electronic circuit, and a processor (shared, dedicated, or group). The computer 144 can further include a memory 148 that executes one or more software or firmware programs, a combinational logic circuit, and/or other suitable components that provide the described functionality. The processor 146 can include an input/output interface 150 for communicating with various components, such as an input frame source 152 and the SLM 102. The input frame source 152 can provide subframes representing associated partial fields of view to be projected onto the display surface 122 as holographic images. In this non-limiting example, the processor 146 can use known image processing techniques to determine a phase hologram to output on the two-dimensional pixel array 104 that will result in the diffracted images 136, 138 responsive to the LASER 128 and upon beam forming through the Fourier-transform lens 140, resulting in a desired projected subframes 130 upon the display surface 122. However, in other examples, the system may not include the Fourier-transform lens. When the system 100 is incorporated in a vehicle, the input frame source 152 can be a vehicle control unit, for instance, to display gauge values, logos, information, entertainment content, or other such image-based data.

The processor 146 may be communicatively coupled to, e.g., via the vehicle communications module, more than one local processor, e.g., included in electronic processor units (ECUs) or the like included in the vehicle for monitoring and/or controlling various vehicle components. The processor 146 is generally arranged for communications on the vehicle communications module via an internal wired and/or wireless network, e.g., a bus or the like in the vehicle 106, such as a controller area network (CAN) or the like, and/or other wired and/or wireless mechanisms. Via the vehicle communications module, the processor 146 may transmit messages to various devices in the vehicle 106 and/or receive messages from the various devices, e.g., vehicle sensors, actuators, vehicle components, a human machine interface (HMI), etc. Alternatively or additionally, in cases where the processor comprises a plurality of devices, the vehicle communications network may be used for communications between devices represented as the computer 144 in this disclosure. Further, as mentioned below, various processors and/or vehicle sensors may provide data to the computer 144. The processor 146 can receive and analyze data from sensors substantially continuously and/or periodically. Further, object classification or identification techniques can be used, e.g., in a processor 146 based on lidar sensor, camera sensor, etc., data, to identify the lane markings, a type of object, e.g., vehicle, person, rock, pothole, bicycle, motorcycle, etc., as well as physical features of objects.

The computer 144 further has a memory 148 including one or more forms of computer readable media, and stores instructions executable by the processor 146 for performing various operations, including as disclosed herein. The memory 148 includes instructions such that the processor 146 is programmed to control the two-dimensional pixel array 104 of the SLM 102 to generate the subframes 130 (FIG. 3) for associated partial fields of view. The processor 146 is further programmed to control the scanner 142 to direct the subframes 130 onto an associated one of the sections 124 of the display surface 122 for displaying a reconstructed image within a full field of view, where the full field of view includes each of the partial fields of view. The reconstructed image on the display surface 122 has a total image resolution, and the total image resolution is higher than the SLM resolution.

Referring to FIG. 3, the processor 146 is programmed to control the scanner 142 for directing the subframes 130 onto the sections 124 of the display surface 122, such that the subframes 130 are tiled adjacent to one another without overlapping one another. The processor 146 is further programmed to control the scanner 142 to direct the subframes 130 onto the sections 124, with the sections 124 being arranged in a plurality of rows 154 and a plurality of columns 156 on the display surface 122. In this example, the total image resolution is equal to the SLM resolution multiplied by a number of the sections displaying the subframes 130. In addition, the display surface 122 has a display surface eyebox size that is equal to the SLM eyebox size multiplied an inverse of the ratio between the partial field of view of one of the sections and the full field of view.

Figure 4:
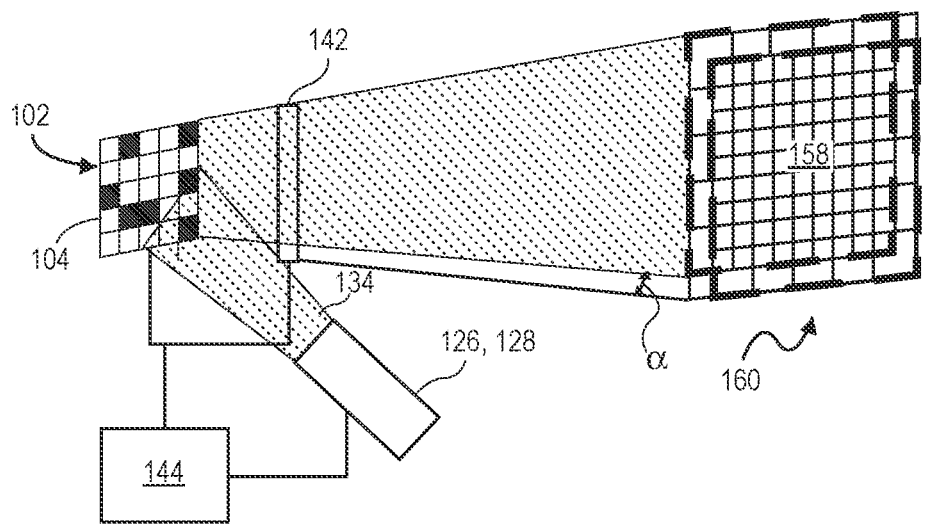
FIG. 4 is a schematic view of the system of FIG. 2, illustrating another example of the system for dithering subframes with partial fields of view to provide a frame with a full field of view and a resolution that is higher than the SLM resolution.

Referring to FIG. 4, another example of the processor 146 can be programmed to control the SLM 102 to angularly dither the subframes 130 onto the sections 124, such that each of the subframes 130 has an enhanced portion 158 and the enhanced portions 158 of the subframes 130 overlap one another on the display surface 122. The enhanced portions 158 of the associated subframes 130 have a perceived resolution that is higher than the SLM resolution.

Figure 5:
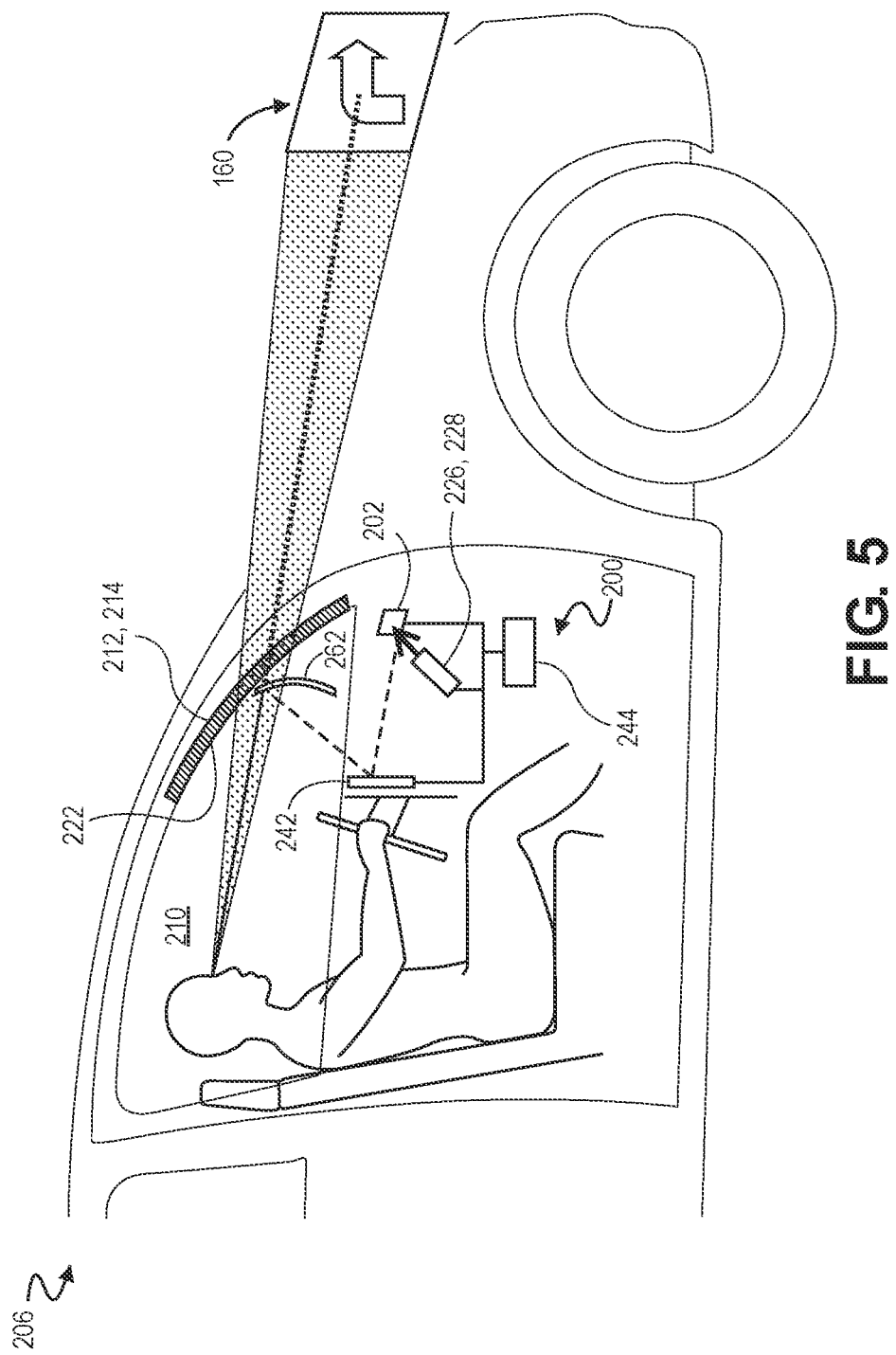
FIG. 5 is a schematic view of a passenger cabin of the motor vehicle of FIG. 1, illustrating another example of the holographic display system.

Referring to FIG. 5, another example of a holographic display system 200 is similar to the system 100 of FIG. 2 and has the same components identified by the same numbers increase by 100. However, while the system 100 of FIG. 2 includes the display surface 122 in the form of a cabin-facing surface of the front windshield 114, the system 200 includes a combiner glass 262 that is separate from the front windshield 214 and disposed within the passenger cabin 210, and the display surface 222 is a portion of the combiner glass 262.

Figure 6:
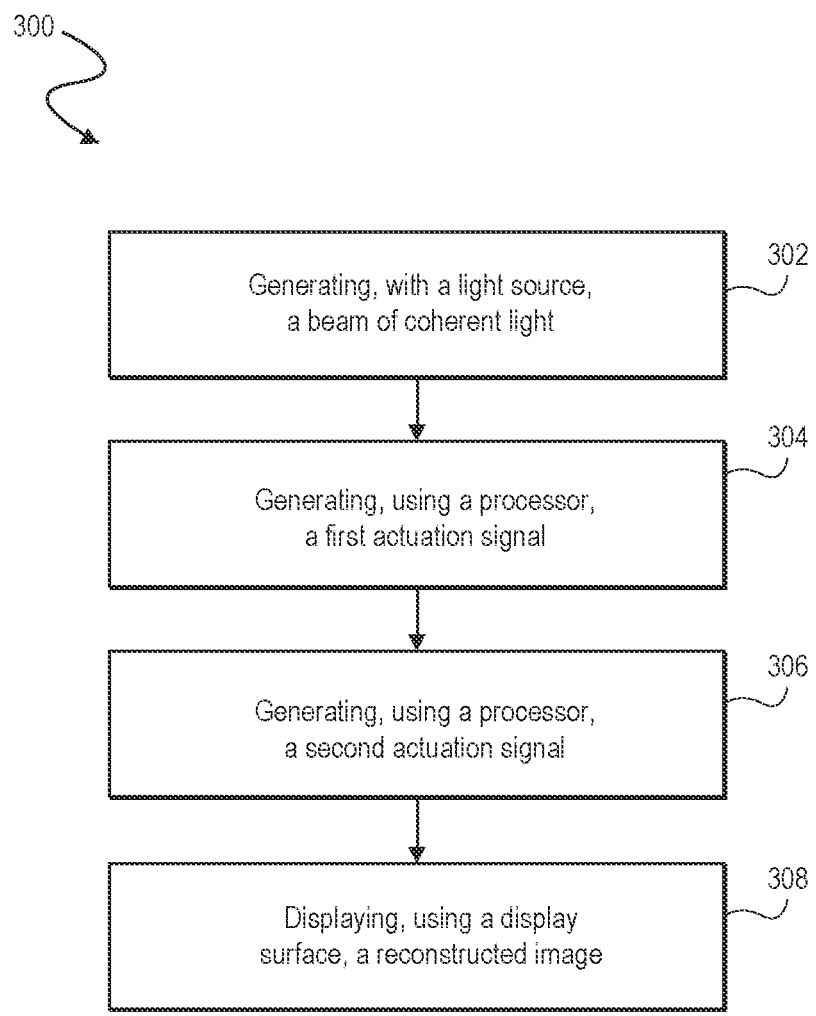
FIG. 6 is a flow chart of one exemplary method of operating the holographic display system of FIG. 1.

Referring to FIG. 6, a method 300 of operating the holographic display system 100 for the motor vehicle 106. The method 300 begins at block 302 with the light source 126 generating the beam of coherent light.

At block 304, the processor 146 generates a first actuation signal for controlling the two-dimensional pixel array of the SLM 102 to generate the subframes 130. The two-dimensional pixel array 104 of the SLM 102 modulates the beam of coherent light to generate the subframes 130, such that each of the subframes 130 is associated with one of a plurality of partial fields of view, in response to the SLM 102 receiving the first actuation signal from the processor 146.

At block 306, the processor 146 generates a second actuation signal that controls the scanner 142 to direct the subframes 130 onto an associated one of the sections 124 of the display surface 122. The scanner 142 directs the subframes 130 onto the associated sections 124 of the display surface 122 for displaying the reconstructed image within the full field of view, such that the full field of view includes each of the partial fields of view, in response to the scanner receiving the second actuation signal from the processor 146. In one non-limiting example, where the processor engages in a stitching mode, the processor 146 controls the scanner 142 to direct the subframes 130 onto the sections 124, such that the subframes 130 are tiled adjacent to one another without overlapping one another. In another non-limiting example, where the processor engages in a dithering mode, the processor 146 controls the scanner 142 to angularly dither the subframes 130 onto the sections 124, such that the subframes 130 are overlapping one another.

At block 308, the reconstructed image 160 is displayed on the display surface 122, such that the reconstructed image has a total image resolution that is higher than the SLM resolution and an eyebox size that is larger than the eyebox size of the SLM 102.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A holographic display system for a motor vehicle, the holographic display system comprising:
    a light source for generating a beam of coherent light;
    a spatial light modulator (SLM) comprising a two-dimensional pixel array having an SLM resolution, and the two-dimensional pixel array is encoded with holograms for diffracting the coherent light and modulating the beam of coherent light to generate a plurality of subframes, with each of the subframes being associated with one of a plurality of partial fields of view;
    a display surface comprising a plurality of sections;
    a computer comprising:
        a processor coupled to the light source and the SLM; and
        a memory including instructions such that the processor is programmed to control at least the two-dimensional pixel array of the SLM to generate the subframes for displaying a reconstructed image within a full field of view, where the full field of view includes each of the partial fields of views; and
    a scanner for directing the subframes onto an associated one of the sections of the display surface;
    wherein the processor is coupled to the SLM and controls the scanner to direct the subframes onto an associated one of the sections of the display surface for displaying the reconstructed image within the full field of view, where the full field of view includes each of the partial fields of view; and
    wherein the processor is programmed to control at least one of the scanner and the SLM to direct the subframes onto the sections, with the sections being arranged in a plurality of rows and a plurality of columns on the display surface.

2. The holographic display system of claim 1 wherein the reconstructed image on the display surface has a total image resolution, and the total image resolution is higher than the SLM resolution.

3. The holographic display system of claim 2 wherein the processor is further programmed to control at least the SLM to direct the subframes onto the sections, such that the subframes are tiled adjacent to one another without overlapping one another.

4. The holographic display system of claim 3 wherein the total image resolution is equal to the SLM resolution multiplied by a number of the sections displaying the subframes.

5. The holographic display system of claim 4 wherein the two-dimensional pixel array of the SLM has an SLM eyebox size, and the display surface has a display surface eyebox size that is equal to the SLM eyebox size multiplied an inverse of a ratio between the partial field of view of one of the sections and the full field of view.

6. A motor vehicle comprising:
    a body defining a passenger cabin;
    a plurality of glass panels surrounding the passenger cabin, with the glass panels including at least one of a front windshield, a rear windshield, a sunroof, and a plurality of windows surrounding the passenger cabin; and
    a holographic display system coupled to the body and comprising:
        a light source for generating a beam of coherent light;
        a spatial light modulator (SLM) comprising a two-dimensional pixel array that has an SLM resolution, and the two-dimensional pixel array is encoded with holograms for diffracting the coherent light and modulating the beam of coherent light to generate a plurality of subframes, with each of the subframes being associated with one of a plurality of partial fields of view;

a display surface comprising a plurality of sections; and a computer comprising:

a processor coupled to the light source and the SLM; and a memory including instructions such that the processor is programmed to control at least the two-dimensional pixel array of the SLM to generate the subframes for displaying a reconstructed image within a full field of view, where the full field of view includes each of the partial fields of view.

7. The motor vehicle of claim 6 wherein the display surface comprises a portion of at least one of the front windshield, the rear windshield, the sunroof, and the windows.

8. The motor vehicle of claim 7 wherein the holographic display system further comprises a combiner glass disposed within the passenger cabin, and the display surface is a portion of the combiner glass.

9. The motor vehicle of claim 8 wherein the light source comprises a LASER, and the SLM comprises one of a liquid crystal on silicon (LCOS) SLM and a MEMS mirror SLM.

10. The motor vehicle of claim 9 wherein the reconstructed image on the display surface has a total image resolution, and the total image resolution is higher than the SLM resolution.

11. The motor vehicle of claim 10 wherein the processor is further programmed to control at least the SLM to direct the subframes onto the sections, such that the subframes are tiled adjacent to one another without overlapping one another.

12. The motor vehicle of claim 11 wherein the total image resolution is equal to the SLM resolution multiplied by a number of the sections displaying the subframes.

13. The motor vehicle of claim 12 wherein the two-dimensional pixel array of the SLM has an SLM eyebox size, and the display surface has a display surface eyebox size that is equal to the SLM eyebox size multiplied an inverse of a ratio between the partial field of view of one of the sections and the full field of view generated by the SLM.

14. The motor vehicle of claim 13 wherein the system further comprises a scanner for directing the subframes onto an associated one of the sections of the display surface;

wherein the processor is coupled to the scanner and programmed to control the scanner to direct the subframes onto an associated one of the sections of the display surface for displaying the reconstructed image within the full field of view, where the full field of view includes each of the partial fields of view;

wherein the processor is further programmed to control the scanner to direct the subframes onto the sections, with the sections being arranged in a plurality of rows and a plurality of columns on the display surface.

15. The motor vehicle of claim 14 wherein the processor is further programmed to control the SLM to angularly dither the subframes onto the sections, such that each of the subframes has an enhanced portion and the enhanced portions of the subframes overlap one another on the display surface, where the enhanced portions of the associated subframes have a perceived resolution that is higher than the SLM resolution.

16. A holographic display system for a motor vehicle, the holographic display system comprising:

a light source for generating a beam of coherent light;

a spatial light modulator (SLM) comprising a two-dimensional pixel array having an SLM resolution, and the two-dimensional pixel array is encoded with holograms for diffracting the coherent light and modulating the beam of coherent light to generate a plurality of subframes, with each of the subframes being associated with one of a plurality of partial fields of view;

a display surface comprising a plurality of sections; and a computer comprising:

a processor coupled to the light source and the SLM; and a memory including instructions such that the processor is programmed to control at least the two-dimensional pixel array of the SLM to generate the subframes for displaying a reconstructed image within a full field of view, where the full field of view includes each of the partial fields of views;

wherein the processor is further programmed to control the SLM to angularly dither the subframes onto the sections, such that each of the subframes has an enhanced portion and the enhanced portions of the subframes overlap one another on the display surface, where the enhanced portions of the associated subframes have a perceived resolution that is higher than the SLM resolution.

17. The holographic display system of claim 16 wherein the reconstructed image on the display surface has a total image resolution, and the total image resolution is higher than the SLM resolution.

* * * * *